(12) United States Patent
Forenza et al.

(10) Patent No.: US 8,130,862 B2
(45) Date of Patent: Mar. 6, 2012

(54) PRECODING SYSTEM AND METHOD FOR MULTI-USER TRANSMISSION IN MULTIPLE ANTENNA WIRELESS SYSTEMS

(75) Inventors: Antonio Forenza, Austin, TX (US); Robert W. Heath, Jr., Austin, TX (US); Manish Airy, Delhi (IN)

(73) Assignee: Intellectual Ventures Holding 40 LLC, Las Vegas, NV (US)

( * ) Notice: Subject to any disclaimer, the term of this patent is extended or adjusted under 35 U.S.C. 154(b) by 869 days.

(21) Appl. No.: 11/791,090

(22) PCT Filed: Nov. 16, 2005

(86) PCT No.: PCT/US2005/041697
§ 371 (c)(1),
(2), (4) Date: Jul. 25, 2008

(87) PCT Pub. No.: WO2006/055719
PCT Pub. Date: May 26, 2006

(65) Prior Publication Data
US 2008/0273618 A1    Nov. 6, 2008

Related U.S. Application Data

(60) Provisional application No. 60/628,221, filed on Nov. 16, 2004.

(51) Int. Cl.
*H04B 7/00*     (2006.01)
*H03K 9/00*     (2006.01)
*H04L 27/06*    (2006.01)
*H04L 7/00*     (2006.01)

(52) U.S. Cl. ........ 375/295; 375/316; 375/299; 375/340; 375/358; 455/68; 455/69

(58) Field of Classification Search .......... 375/229–236, 375/299, 295, 316, 346, 347, 350, 348, 358; 455/24, 68–71, 39, 500, 515, 517, 67.11–67.313, 455/126, 113, 127.2, 226.1–226.4
See application file for complete search history.

(56) References Cited

U.S. PATENT DOCUMENTS

| | | | |
|---|---|---|---|
| 6,097,771 A | 8/2000 | Foschini | |
| 6,144,711 A | 11/2000 | Raleigh et al. | |
| 6,298,092 B1 | 10/2001 | Heath, Jr. et al. | |
| 6,351,499 B1 | 2/2002 | Paulraj et al. | |
| 6,377,632 B1 | 4/2002 | Paulraj et al. | |
| 6,400,699 B1 | 6/2002 | Airy et al. | |
| 7,013,165 B2 | 3/2006 | Yoon | |
| 7,245,879 B2 * | 7/2007 | Sadri et al. | 455/67.11 |
| 7,327,797 B2 * | 2/2008 | Yu et al. | 375/267 |
| 7,406,337 B2 * | 7/2008 | Kim et al. | 455/562.1 |
| 7,561,637 B2 * | 7/2009 | Jonsson et al. | 375/316 |

(Continued)

OTHER PUBLICATIONS

PCT Search Report and Written Opinion dated May 25, 2006 corresponding to the related PCT US05/41697.

(Continued)

*Primary Examiner* — Dac V. Ha
*Assistant Examiner* — Linda Wong
(74) *Attorney, Agent, or Firm* — Schwabe, Williamson & Wyatt, P.C.

(57) ABSTRACT

A transmission method and system are provided wherein the system and method use precoding and sum rate optimization beam forming to create a capacity transmission.

34 Claims, 9 Drawing Sheets

U.S. PATENT DOCUMENTS

| | | | |
|---|---|---|---|
| 7,570,696 B2 * | 8/2009 | Maltsev et al. | 375/260 |
| 7,778,342 B2 * | 8/2010 | Larsson et al. | 375/267 |
| 7,876,729 B1 * | 1/2011 | Grilli et al. | 370/332 |
| 2002/0000948 A1 | 1/2002 | Chun et al. | |
| 2003/0011516 A1 | 1/2003 | Moch | |
| 2003/0072396 A1 * | 4/2003 | Binshtok et al. | 375/346 |
| 2003/0085833 A1 | 5/2003 | Yu | |
| 2003/0086504 A1 * | 5/2003 | Magee et al. | 375/262 |
| 2003/0125091 A1 * | 7/2003 | Choi et al. | 455/562 |
| 2003/0162567 A1 | 8/2003 | Raghothaman et al. | |
| 2003/0185310 A1 * | 10/2003 | Ketchum et al. | 375/259 |
| 2003/0216156 A1 | 11/2003 | Chun | |
| 2004/0120411 A1 * | 6/2004 | Walton et al. | 375/260 |
| 2004/0121810 A1 | 6/2004 | Goransson et al. | |
| 2004/0152458 A1 * | 8/2004 | Hottinen | 455/423 |
| 2004/0219937 A1 * | 11/2004 | Sugar et al. | 455/500 |
| 2004/0233871 A1 * | 11/2004 | Seki et al. | 370/331 |
| 2005/0037718 A1 * | 2/2005 | Kim et al. | 455/101 |
| 2005/0047347 A1 * | 3/2005 | Lee et al. | 370/241 |
| 2006/0019709 A1 * | 1/2006 | Kim et al. | 455/562.1 |
| 2006/0072524 A1 * | 4/2006 | Perahia et al. | 370/338 |
| 2008/0095121 A1 * | 4/2008 | Shattil | 370/335 |
| 2009/0280856 A1 * | 11/2009 | Ohwatari et al. | 455/522 |
| 2010/0062708 A1 * | 3/2010 | Sangiamwong et al. | 455/24 |

OTHER PUBLICATIONS

Fischer, R. et al., "Precoding and Signal Shaping for Transmission over MIMO Channels," Proceedings of the Canadian Workshop on Information Theory, May 2003, pp. 83-87.

Heath, R. W. et al., "Multiuser Diversity for MIMO Wireless Systems with Linear Receivers," Proceedings of the IEEE Thirty-fifth Asilomar Conference on Signals, Systems and Computers, Nov. 2001, pp. 1194-1199, vol. 2.

Jindal, N. et al., "On the Duality of Gaussian Multiple-Access and Broadcast Channels," IEEE International Symposium on Information Theory, Jun. 2002, p. 500.

Paulraj, A. J., "Space-time Processing for Wireless Communications," IEEE Signal Processing Magazine, Nov. 1997, 4 pages.

Telatar, E., "Capacity of Multi-antenna Gaussian Channels," AT&T Bell Laboratories internal memo, Jun. 1995.

Erez, U. et al., "Capacity and Lattice Strategies for Canceling Known Interference," Proceedings of the International Symposium on Information Theory and its Applications, Nov. 2000, 32 pages.

Van Veen, B. D. et al., "Beamforming: A Versatile Approach to Spatial Filtering," IEEE Acoustics, Speech and Signal Processing Magazine, Apr. 1988, pp. 4-24, vol. 5, No. 2.

Viswanath, P. et al., "Opportunistic Beamforming Using Dumb Antennas," IEEE Transactions on Information Theory, Jun. 2002, pp. 1277-1294, vol. 48, No. 6.

Yu, W. et al., "Trellis Precoding for the Broadcast Channel," IEEE Global Telecommunications Conference, Nov. 2001, pp. 1344-1348, vol. 2.

Zamir, R. et al., "Nested Linear/Lattice Codes for Structured Multiterminal Binning," IEEE Transactions on Information Theory, Jun. 2002, pp. 1250-1276, vol. 48, No. 6.

Vishwanath, S. et al., "On the Capacity of Multiple Input Multiple Output Broadcast Channels," IEEE International Conference on Communication, Apr. 2002, pp. 1444-1450, vol. 3.

International Preliminary Report on Patentability, issued in International Patent Application No. PCT/US2005/041697, mailed May 22, 2007, 7 pages.

Caire, G. et al., "On Achivable Rates in a Multi-Antenna Broadcast Downlink," 38th Annual Allerton Conference on Communication, Control and Computing, Oct. 2000, pp. 715-724.

Costa, M. H. M., "Writing on Dirty Paper," IEEE Transactions on Information Theory, May 1983, pp. 439-441, vol. 29, No. 3.

Hwang et al., "A Random Beamforming Technique in MIMO Systems Exploiting Multiuser Diversity," IEEE International Conference on Communications, May 2003, pp. 3225-3229, vol. 5.

Tomlinson, M., "New Automatic Equaliser Employing Modulo Arithmetic," Electronics Letters, Mar. 25, 1971, pp. 138-139, vol. 7, Nos. 5/6.

Miyakawa, H. et al., "A Method of Code Conversion for Digital Communication Channel with Intersymbol Interference," The Transactions of the Institute of Electronics and Communication Engineers of Japan, Jun. 1969, pp. 272-273, vol. 52-A, No. 6.

Schubert, M. et al., "Joint 'Dirty Paper' Pre-Coding and Downlink Beamforming," IEEE 7th International Symposium on Spread-Spectrum Techniques & Applications, Sep. 2002, pp. 536-540.

Eyuboglu, M. V. et al., "Trellis Precoding: Combined Coding, Precoding and Shaping for Intersymbol Interference Channels," IEEE Transactions on Information Theory, Mar. 1992, pp. 301-314, vol. 38, No. 2.

Boche, H. et al., "Analysis of Different Precoding/Decoding Strategies for Multiuser Beamforming," 57th IEEE Semiannual VTC, Apr. 2003, pp. 39-43, vol. 1.

* cited by examiner

PRECODING SYSTEM AND METHOD FOR MULTI-USER TRANSMISSION IN MULTIPLE ANTENNA WIRELESS SYSTEMS

PRIORITY CLAIM/RELATED APPLICATION

This application is a national phase application of PCT/US2005/041697 filed on Nov. 16, 2005, and claims priority thereto under 35 USC 371. PCT/US2005/041697, in turn, claims priority from U.S. Provisional Application No. 60/628,221 filed on Nov. 16, 2004 and entitled "Precoding System and Method for Multi-User Transmission in Multiple Antenna Wireless Systems," under 35 USC 119(e), the content of which is incorporated by reference herein in its entirety.

FIELD OF THE INVENTION

The invention relates to a wireless communications system and method and in particular to a multi-user transmission in a multiple antenna wireless system.

BACKGROUND OF THE INVENTION

Various wireless communication systems are known. One promising solution to enhance throughput and coverage of next generation wireless systems is multiple-input multiple-output (MIMO) technology. A MIMO link is enabled by multiple antennas at the transmitter and receiver. One example of wireless communications systems are the cellular networks. For a multiple antenna broadcast channel, such as the downlink of a cellular system, it is possible to design transmit/receive strategies to maximize the downlink throughput (i.e., capacity achieving strategies), by enabling simultaneous communication links for multiple users. Capacity achieving transmit strategies are characterized by a centralized transmitter (the cell site/tower) that simultaneously communicates with multiple receivers (cellular phones that are involved with the communications session). Conventional multi-user multiple antenna systems employ orthogonal pre-coders (i.e., spatially orthogonal beamforming weights) to transmit parallel streams to multiple users, to maximize the signal strength of each user and reduce the interference. In realistic propagation conditions (i.e., spatially correlated wireless channels), the performance of traditional orthogonal precoders degrades, since the interference cannot be completely removed at the transmitter (especially for increasing number of users). An alternative method is to pre-subtract the interference at the transmitter (i.e., dirty paper/tape codes), enabling multiple parallel interference-free transmissions over the broadcast channel. Recently, there has been substantial theoretical work on the performance of dirty paper/tape codes for the MIMO broadcast channel. The present invention is a practical implementation of these transmission techniques for multi-user MIMO systems.

SUMMARY OF THE INVENTION

A communications system is provided that implements a capacity-approaching transmit strategy that uses a combination of beamforming and precoding for known interference to allow simultaneous communication between a transmitter and multiple receivers. The system includes a practical capacity-approaching pre-coding system for vector broadcast channels that uses ordinary quadrature amplitude multiplexing (QAM) constellations for signaling. At each receiver, the system has a slicer that allows detection of the precoded symbols in the presence of residual interference so that the signal for that received may be decoded despite the residual interference.

Thus, in accordance with the invention, a method for simultaneously transmitting signals between a transmitter and at least two receivers wherein the transmitted signals for the at least two receivers interfere with each other is provided. During the method, the channel state information about the broadcast channel between the transmitter and the at least two receivers is collected. The transmitter may then calculate a beam weight for a transmitted signal to each of the at least two receivers using sum rate optimization and the channel state information to generate at least two receiver beam weights. Using the at least two receiver beam weights, a set of slicer parameters is determined wherein the set of slicer parameters including control parameters. Then, a transmitted signal is generated, based on the parameters, for one of the receivers in which interference from the transmitted signal of the other receiver is subtracted to generate an interference free transmitted signal. In addition, the control parameters are transmitted to the receiver that does not receive the interference free transmitted signal. Then, the receiver that does not receive the interference free transmitted signal demodulates the transmitted signal using the transmitted control parameters to remove any interference from the transmitted signal.

In accordance with another aspect of the invention, a transmission apparatus for simultaneously transmitting signals between a transmitter and at least two receivers is provided wherein the transmitter simultaneously generates transmitted signals for the at least two receivers wherein the transmitted signals interfere with each other. The transmitter further comprises a signal processing module that determines a set of characteristics of the transmitted signals for the at least two receivers, and a waveform generator that generates the transmitted signals from the at least two receivers based on the determined characteristics of the transmitted signals. The signal processing module collects channel state information about the broadcast channel between the transmitter and the at least two receivers and calculates a beam weight for a transmitted signal to each of the at least two receivers using sum rate optimization and the channel state information to generate at least two receiver beam weights. The signal processing module also determines a set of slicer parameters based on the at least two receiver beam weights wherein the set of slicer parameters includes control parameters and generates a transmitted signal, based on the parameters, for one of the receivers in which interference from the transmitted signal of the other receiver is subtracted to generate an interference free transmitted signal. The signal processing module also transmits the control parameters to the receiver that does not receive the interference free transmitted signal.

In accordance with another aspect of the invention, a method to suppress interference from simultaneously transmitted signals is provided. In the method, a beam weight for each transmitted signal using sum rate optimization and a set of channel state information for the broadcast channel is calculated. The calculated beam weights are used to determine a set of slicer parameters wherein the set of slicer parameters including control parameters. A transmitted signal is then precoded based on the set of slicer parameters for a receiver in which interference from the transmitted signal of another receiver is subtracted to generate an interference free transmitted signal.

DETAILED DESCRIPTION OF A PREFERRED EMBODIMENT

The invention is particularly applicable to a cellular multiple input, multiple output transmission system and it is in this context that the invention will be described. It will be appreciated, however, that the system and method in accordance with the invention has greater utility since the MIMO transmission system may be used with 1) next generation multiple antenna wireless systems including 3G/4G cellular, WCDMA, 802.11n, 802.16, WLANs and FW/BWA systems; and 2) wired communications systems, such as DSL, ADSL, etc., and all of these other known and yet to be developed communication systems are within the scope of the invention.

Figure 1:
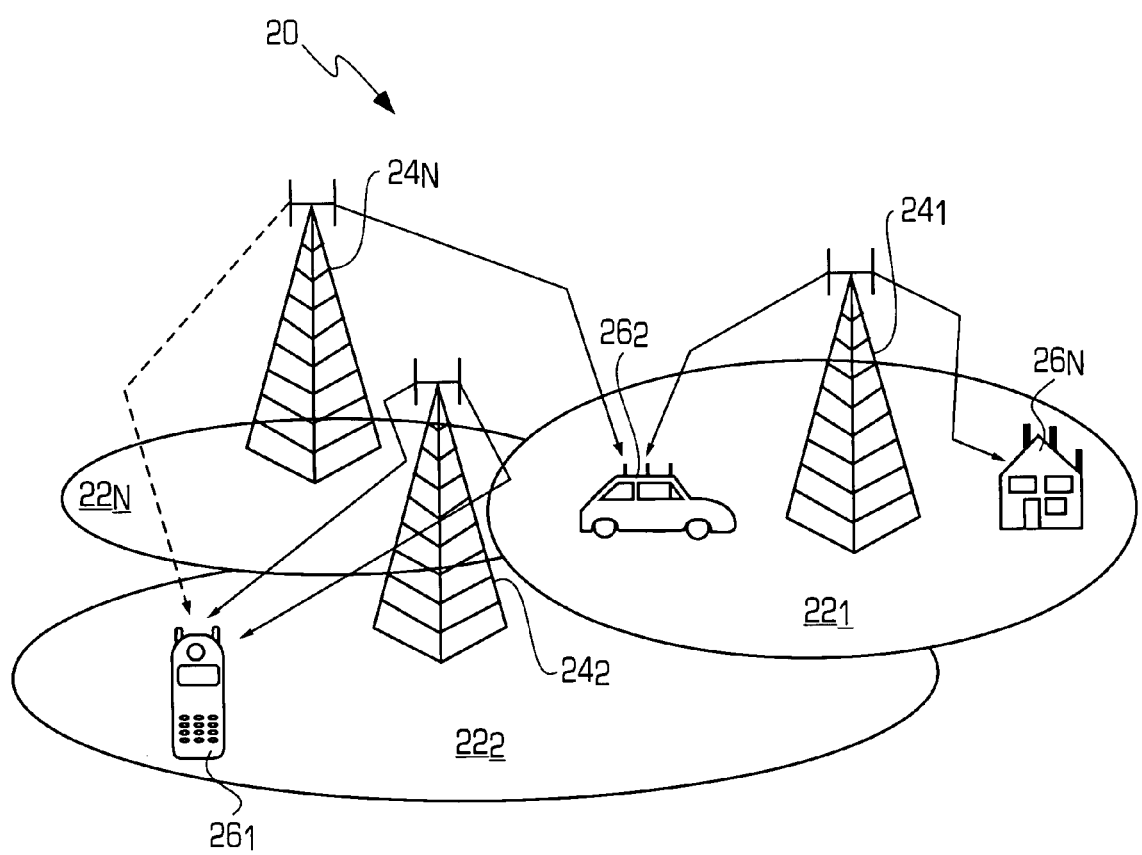
FIG. 1 illustrates an example of a multiple input, multiple output (MIMO) communication system.

FIG. 1 illustrates an example of a multiple input, multiple output (MIMO) communication system 20. In this example shown in FIG. 1, the MIMO system is a cellular system that has one or more cell regions 22 (such as cell regions $22_1$, $22_2$, $22_N$ in the example in FIG. 1) wherein the cell regions may overlap with each other as shown in FIG. 1. Within each cell region 22 is a transceiver 24 (such as transceiver $24_1$, $24_2$, $24_N$ in the example in FIG. 1) that communicates wirelessly with one or more receivers 26 such as a cellular phone $26_1$, an automobile $26_2$ and a residence $26_N$ as shown. The structure of the transceiver in the system shown in FIG. 1 is well known and is not described further herein. Each transceiver in this system may communicate with multiple receivers simultaneously so that it is desirable to be able to efficiency perform that communication with minimal loss of signal and maximum use of the bandwidth. Typically, spatially orthogonalized transmissions to the multiple users (with minimal interference between the signals) is used and each receiver can decode its signal from the transmissions. However, it is desirable to maximize the number of simultaneous communication signals (the capacity of the system) for the MIMO transmission system and this is not achieved by the typical system that uses spatially orthogonalized transmissions, due to the adverse effect of the residual interference. However, a MIMO transmission apparatus in accordance with the invention maximizes the capacity of the broadcast link while permitting the communications to multiple users and receivers.

Figure 2:
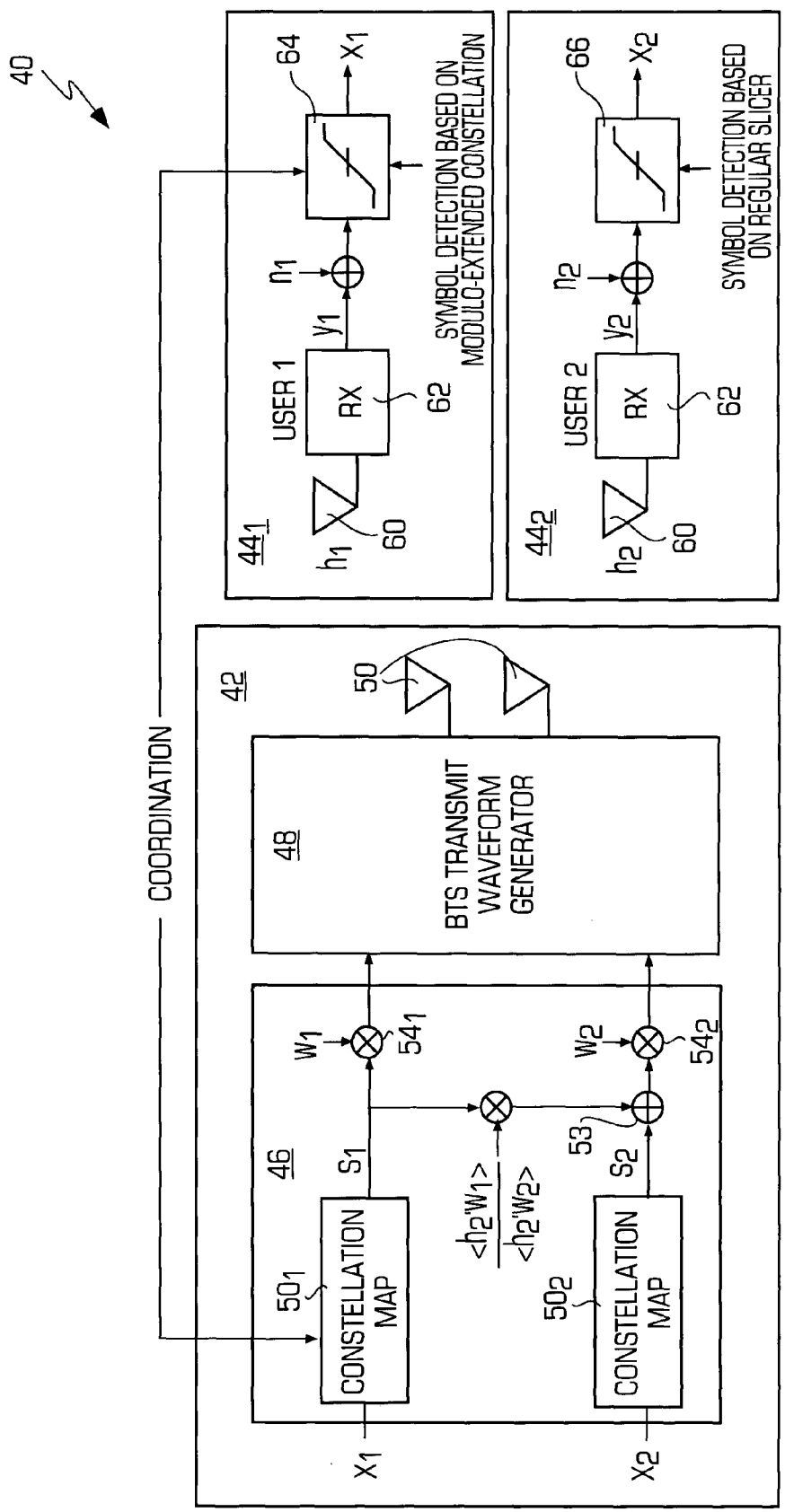
FIG. 2 illustrates an example of an embodiment of a MIMO transmission apparatus.

FIG. 2 illustrates an example of an embodiment of the MIMO transmission apparatus 40 that may be part of the MIMO system 20 shown in FIG. 1. In the example in FIG. 2, a two transmission antenna, two user and one receiver antenna per user transmission apparatus is described for illustrative purposes. However, the MIMO transmission apparatus may be used with a plurality of users, a plurality of transmission antennas and a plurality of antennas per user so that the example shown does not limit the scope of the invention. In addition, although the example is in the context of a cellular system, the MIMO transmission apparatus also may be used with 1) next generation multiple antenna wireless systems including 3G/4G cellular, WCDMA, 802.11n, 802.16, WLANs and FW/BWA systems; and 2) wired communications systems, such as DSL, ADSL, etc., and all of these other known and yet to be developed communication systems are within the scope of the invention. The transmission apparatus 40 includes a transmitter 42 and one or more receivers such as user 1 receiver $44_1$ and user 2 receiver $44_2$ wherein the transmitter simultaneously transmits communication signals to both of the receivers. In this example, the transmitter 42 may be located at the transceiver 24 shown in FIG. 1 and each receiver 44 corresponds to the receiver 26 of FIG. 1. As shown, the transmitter 42 and at least one receiver 44 may communicate some coordination information as described in more detail below that allows the receiver to decode the transmitted signal.

The transmitter may further comprise a signal processing circuit 46 (that may preferably include a precoder unit), a waveform generator 48 and one or more transmit antennas 50. The signal processing circuit 46 may preferably be implemented as a digital signal processor or other similar circuit that executes a plurality of lines of code to implement the functions and operations of the transmitted described below. In the example shown, the channel state information (CSI) for each receiver is known and is fed into the transmitter 42. The channel state information is used by the signal processor 46 to precode certain information into the communicated signals as described below in more detail. The transmitter 42 receives a signal ($X_1$) to be sent to the first receiver $44_1$ and a signal ($X_2$) to be sent to the second receiver $44_2$. The signals are fed into a respective constellation map $51_1$, $51_2$ so that an output symbol set $s_1$ and $s_2$, respectively, are generated for each receiver. In a preferred embodiment of the transmission apparatus, the signal processor implements a dirty tape precoder (preferably a Costa precoder) that codes, into one or more of the transmitted signals, the known interference of the channel. In the example shown in FIG. 1, the signal transmitted to the second receiver $44_2$ is precoded to subtract the interference while the signal being sent to the first receiver is transmitted with some interference using a mixer 53 wherein the interference is removed at the receiver by constructing a slicer as described below. The dirty tape precoding (DPC) is described in more detail below. This precoding that occurs is shown in FIG. 1 as $$\frac{\langle h_2^*, w_1 \rangle}{\langle h_2^*, w_2 \rangle}$$

which is subtracted from the symbols $s_2$. Once that precoding has occurred, the signal $s_1$ is combined with a beam forming vector $w_1$ at mixer $54_1$ for user 1 and the signal $s_2$ is combined by a mixer $54_2$ with a beam forming vector $w_2$ for user 2. The beamforming in accordance with the invention will be described in more detail below. The signals are then fed into the transmit waveform generator 48 that generates signals to be transmitted to the receivers based on the above beamforming and precoding and sent to the receivers via the one or more antennas 50. As shown in FIG. 1, the transmitter 42 and the first receiver $44_1$ coordinate with each other (via the transmitter and receiver communicating information) that allows the receiver to decode the transmission with the interference in the channel.

To achieve this decoding of the transmitted signal with interference, the first receiver $44_1$ has an antenna 60, a receiving circuit 62 which are both known that generate a signal $y_1$. The signal may have a constant ($n_1$) added to the signal which is then fed into a demodulator circuit 64 that, using the coordination information from the transmitter, demodulates the received signal to recover the signal $X_1$. In a preferred embodiment, the demodulator is a slicer circuit implemented as a hardware circuit with processing capabilities that processes the received signal. For the second receiver $44_2$, the receiver has the antenna 60 and receiver circuit 62 and has a constant ($n_2$) added to the received signal. For the second receiver $44_2$, the demodulator circuit 66 (which may be implemented as a slicer circuit) that performs symbol detection based on the known constellation map used for the signals for that receiver. In particular, since the signal to the second receiver had the known interference removed from the transmitted signal, the second receiver can use a typical demodulator to recover the transmitted signal. Using the combination of the DPC and the beamforming, the transmission system achieves near capacity for the broadcast channel while permitting MIMO transmissions. Now, the precoding and beamforming performed by the transmitter is described in more detail.

The precoding and beamforming in accordance with the invention is understood in the context of a Gaussian broadcast channel (BC) with K non-cooperating receivers wherein each receiver is equipped with $M_r$ antennas and the transmitter has $M_t$ antennas. For purposes of this explanation, perfect channel state information is assumed available at the transmitting base station (the transmitter shown in FIG. 2) and the total transmission power (sum power=$P_t$) is bounded. The transmission system and transmission strategy uses the "dirty tape" coding (DPC) strategy wherein coding for causally known interference at the transmitter in the context of practical QAM constellations for signaling is used. Each receiver then has a slicer that allows detection of the precoded symbols. For purposes of explanation, a transmitter with $M_t=2$ and two receivers with $M_r=1$ is used. For the constellations, square M-QAM constellations are used although the extension to non-square QAM constellations is straightforward and is within the scope of the invention. In accordance with the invention, a sum-rate optimizing beamforming vector is combined with a "dirty-tape" encoded transmit waveform and, at each receiver, the system has a slicer circuit that can decode the precoded waveform. So, $s_1$ and $s_2$ denote the transmit symbol, drawn from possibly distinct constellations, for user 1 and user 2 respectively, and $h_1$ and $h_2$ are channel vectors to user 1 and user 2, respectively wherein $h_1, h_2 \in C^{2 \times 1}$. $W_1$ and $w_2$ denote the unitary transmit beamforming vectors for user 1 and user 2 respectively, $w_1, w_2 \in C^{2 \times 1}$. Without any transmit precoding, the transmitted signal at the base station has the following form:

$$x = \sqrt{E_1} w_1 s_1 + \sqrt{E_2} w_2 s_2 \quad (1)$$

where $E_1$ and $E_2$ are the allocated powers to user 1 and user 2, respectively, with $P_t = E_1 + E_2$. In the presence of Gaussian noise, the received signal at the two receivers is given by:

$$y_1 = h_1^T(\sqrt{E_1} w_1 s_1 + \sqrt{E_2} w_2 s_2) + n_1 \quad (2)$$

$$y_2 = h_2^T(\sqrt{E_1} w_1 s_1 + \sqrt{E_2} w_2 s_2) + n_2 \quad (3)$$

Note from equations (2) and (3) above, that if the dot-products, $\langle h_1^*, w_2 \rangle$ and $\langle h_2^*, w_1 \rangle$ are non-zero, then both user 1 and user 2 experience interference from the other users transmission. Dirty tape precoding transforms the transmit signal in (1) such that one of the users sees no interference from the other. In particular let us choose user 2 to be interference free from user 1 transmissions, then dirty tape precoding takes the following form in constructing the transmit waveform:

$$\tilde{x} = \sqrt{E_1} w_1 s_1 + w_2 \left[ \sqrt{E_2} s_2 - \sqrt{E_1} \frac{\langle h_2^*, w_1 \rangle}{\langle h_2^*, w_2 \rangle} s_1 \right] \quad (4)$$

With dirty tape precoding, the received signals at the two receivers is given by:

$$\tilde{y}_1 = \sqrt{E_1} h_1^T \left[ w_1 - \frac{\langle h_2^*, w_1 \rangle}{\langle h_2^*, w_2 \rangle} w_2 \right] s_1 + \sqrt{E_2} h_1^T w_2 s_2 + n_1 \quad (5)$$

$$\tilde{y}_2 = \sqrt{E_2} h_2^T w_2 s_2 + n_2 \quad (6)$$

Note that the received signal at user 2, $y_2$, is independent of user 1 data symbols. Inspecting (4) closely, note that an appropriate and scaled projection of user 1 data symbols was pre-subtracted from user 2's transmit signal, resulting in user 2's received signal being orthogonal to user 1.

Now, sum-rate capacity optimizing beamforming vectors may be formed. The sum-rate capacity for a broadcast channel with $M_t$ transmit antennas and K receivers each with $M_r$ antennas is achieved by finding a set of optimal covariance matrices, $R_k \in C^{M_r \times M_r}$ where k=1, 2, ..., K, for the dual MAC channel that maximize, $$C_{sumRate} = \max_{R_k \geq 0, \Sigma Tr(R_k) \leq P_T} \log_2 \left| I + \sum_k H_k^\uparrow R_k H_k \right| \quad (7)$$

where k indexes the users, $H_k \in C^{M_r \times M_t}$ is the downlink channel for k, $R_k > 0$ indicates that the dual MAC transmit covariance matrices are positive semi-definite. Once the sum-rate optimal dual MAC covariances, $R_k$, are obtained the optimum broadcast transmit covariance matrices, $Q_k$, are found using the duality transformations that are described in more detail in a paper entitled "On the duality of Gaussian multiple-access and broad-cast channels" by N. Jindal et al. in the *Proceedings of the International Symposium on Information Theory*, pgs. 500-504 (June 2002) which is incorporated herein by reference. For the $M_t=2$, $M_r=1$ case, we consider, $Q_k \in C^{2 \times 2}$ and $Q_k^\uparrow$. The power allocated to user k is the trace of $Q_k$, $Tr(Q_k)$ and $Q_k$ is rank 1. The eigenvalue decomposition of $Q_k$ is denoted by $Q_k V_k = V_k D_k$, where $D_k \in R^{2 \times 2}$ is a diagonal matrix of eigenvalues and $V_k \in C^{2 \times 2}$ is a matrix whose columns contain the eigenvectors of $D_k$. The optimum transmit beamforming vectors and power allocations for user are given by, $$W_1 = v_1^{(1)}, \sqrt{E_1} = d_1^{(1)} \quad (8)$$

$$W_2 = v_2^{(1)}, \sqrt{E_2} = d_2^{(1)} \quad (9)$$

Where $d_k^{(1)}$ and $v_k^{(1)}$ are the eigenvalue and corresponding eigenvector for user k (since $Q_k$ is rank 1, there is only one non-zero eigenvalue for each user k). Note that $w_1, w_2 \in C^{2 \times 1}$.

Figure 5:
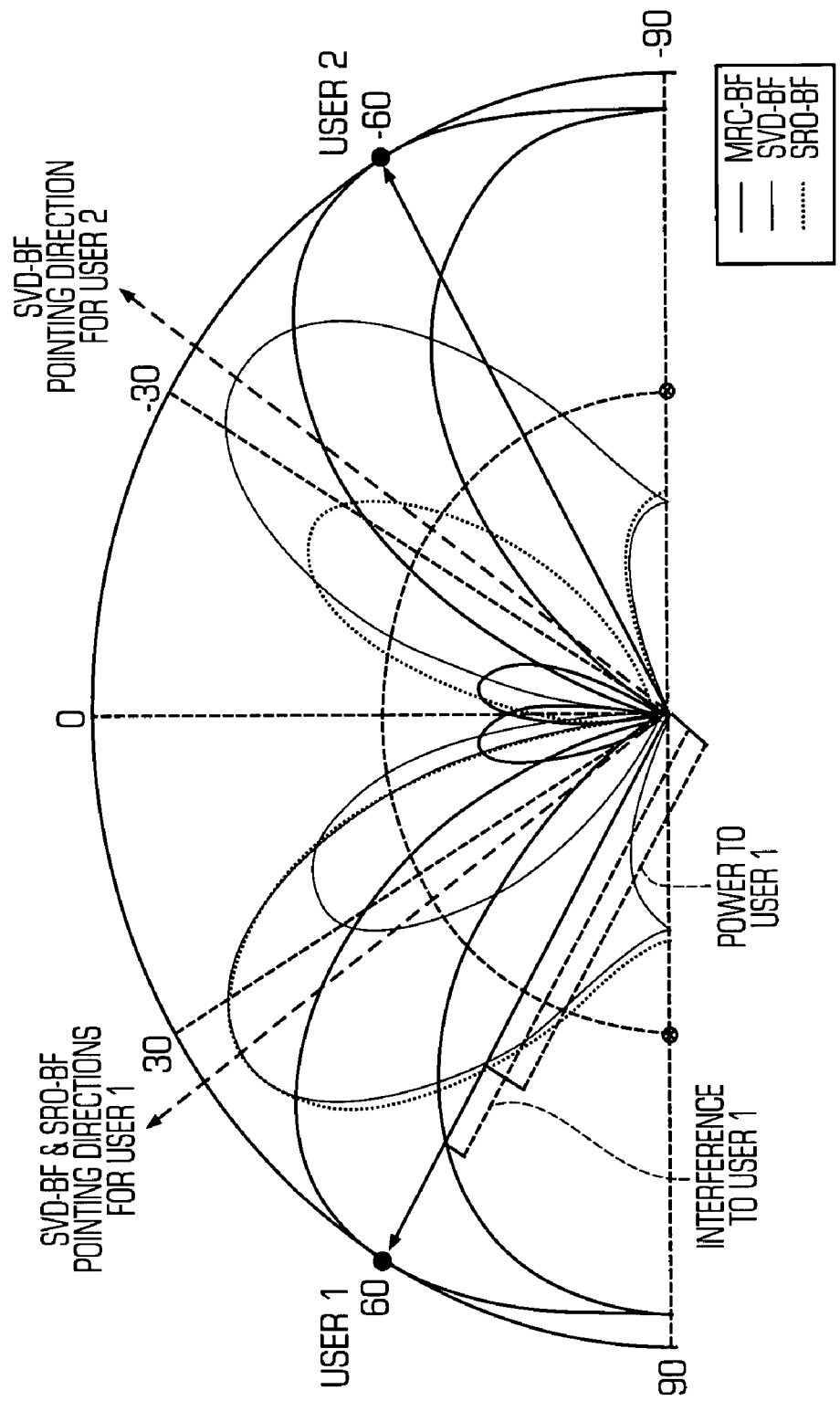
FIG. 5 illustrates an example of the beamforming techniques that may be used with the MIMO transmission apparatus.

FIG. 5 illustrates how the optimum beamforming vector obtained by the sum-rate capacity maximization compares with other techniques like: i) transmit MRC and ii) zero forcing (ZF). with interference nulling.

Transmit MRC: For each user, the BTS chooses the individual user SNR maximizing solution. The curve with crosses forms a beam radiation pattern with a maximum at −I−GO. The curve with stars forms a beam that peaks at −liO. Note however, that the interference to each user from the other is uncontrolled and high.

Linear ZF-Beamforming: Here the weight vector is chosen such that a null is placed towards the direction of the interference. The curves with points and circles plot the corresponding optimal solution. Note that both the curves form beam patterns that peak not at the user locations but in a direction that balances interference generated to the other user.

Sum-Rate Optimizing Beamforming: Here the optimum beamforming vectors from (8) and (9) were used. The resulting beam radiation patterns formed are indicated in black. Interestingly, the beam pattern for user 2 is the transmit MRC solution for user 2 and the beam pattern for user 1 is the ZF-Beamforming solution. User 2 experiences no interference from user 1. However, user 1 sees interference from user 2's beam radiation pattern.

The subtraction of the interference in equation (4) may result in a power enhancement at the transmitter. To keep the range of signal excursions limited and hence restrict the power enhancement there are two options including non-linear precoding and linear precoding.

1) Non-linear Precoding: Suppose that the transmitter uses a M-QAM constellation with adjacent symbols $2p$ units apart. For user 2, since the central transmitter has complete information of the interference from user 1, as described above, this known interference for user 2 may be pre-subtracted prior to transmission. For user 2, the effect of this interference subtraction is as if the original M-QAM constellation was "expanded" on the complex plane and the received vector is a noisy version of the modulo-equivalent transmitted signal. To recover the original data symbol, the receiver either does another modulo operation prior to detection or uses a slicer based on the expanded constellation which is also described above. To restrict the power enhancement due to pre-subtraction, the transmitted symbol vector in (4) may be modified to:

$$\tilde{x} = \sqrt{E_1}\, w_1 s_1 + w_2\left[\left(\sqrt{E_2}\, s_2 - \sqrt{E_1}\, \frac{\langle h_2^*, w_1\rangle}{\langle h_2^*, w_2\rangle} s_1\right) \oplus M\right] \quad (10)$$

Where $\oplus$ denotes the modulo operation that brings the pre-subtracted signal back to the fundamental region of user 2's constellation denoted by $M=\{(-M\rho,M\rho)\times(-M\rho,M\rho)\}$. The precoder produces an effective transmit symbol that can take any value in the fundamental region for user 2 which is $M=\{(-M\rho,M\rho)\times(-M\rho,M\rho)\}$ and causes a transmit power penalty, called precoding power loss.

2) Linear Precoding: As an alternative to the non-linear precoding, the transmitted symbol vector in (4) may be rearranged as:

$$\tilde{x} = \frac{\sqrt{E_1}}{\Gamma(\gamma)}\left[w_1 - \frac{\langle h_2^*, w_1\rangle}{\langle h_2^*, w_2\rangle} w_2\right] s_1 + \sqrt{E_2}\, w_2 s_2 \quad (11)$$

where $\Gamma(\gamma)=\|w_1-\gamma w_2\|$ and $$\gamma = \frac{\langle h_2^*, w_1\rangle}{\langle h_2^*, w_2\rangle}$$

with $\gamma \in \mathbb{C}$. Note that $\Gamma(\gamma)$ is chosen to satisfy the sum power constraint $Pt=E[\tilde{x}^\dagger \tilde{x}]\ E_1+E_2$. Therefore, no precoding power loss is produced. This is the linear power scaling precoding. Now, the receipt and detection of the precoded transmitted signals is described in more detail.

Both non-linear precoding and the linear power scaling precoding result in the received signal at user 2 being orthogonal to user 1's transmission. At the receiver, user 2 compensates for the gain and phase in the effective channel $\sqrt{E_2} h_2^T w_2$. Then, if the non-linear precoding is used, user 2 passes the received signal through the same modulo-M operator as the transmitter and then does a symbol by symbol detection. If instead linear power scaling precoding is used, direct symbol by symbol detection using a traditional M-QAM slicer is sufficient.

User 1 needs to implement a more complex receiver since the modulo operation in equation (10) introduces a non-linear distortion in the transmit signal which is not easy to compensate for at the receiver. The linear power scaling precoding in equation (11) is somewhat easier to decode. The decoding approach below assumes linear power scaling precoding and may be viewed as a practical implementation of superposition coding. The proposed decoding method exploits the structure of the QAM constellations during decoding. In particular, with linear power scaling precoding, the received signal for user 1 is given by:

$$\tilde{y}_1 = h_1^T \tilde{x} + n_1 \quad (12)$$

so that $$\tilde{y}_1 = \frac{\sqrt{E_1}}{\Gamma(\gamma)} h_1^T\left[w_1 - \frac{\langle h_2^*, w_1\rangle}{\langle h_2^*, w_2\rangle} w_2\right] s_1 + \sqrt{E_2}\, h_1^T w_2 s_2) + n_1$$

Figure 6:
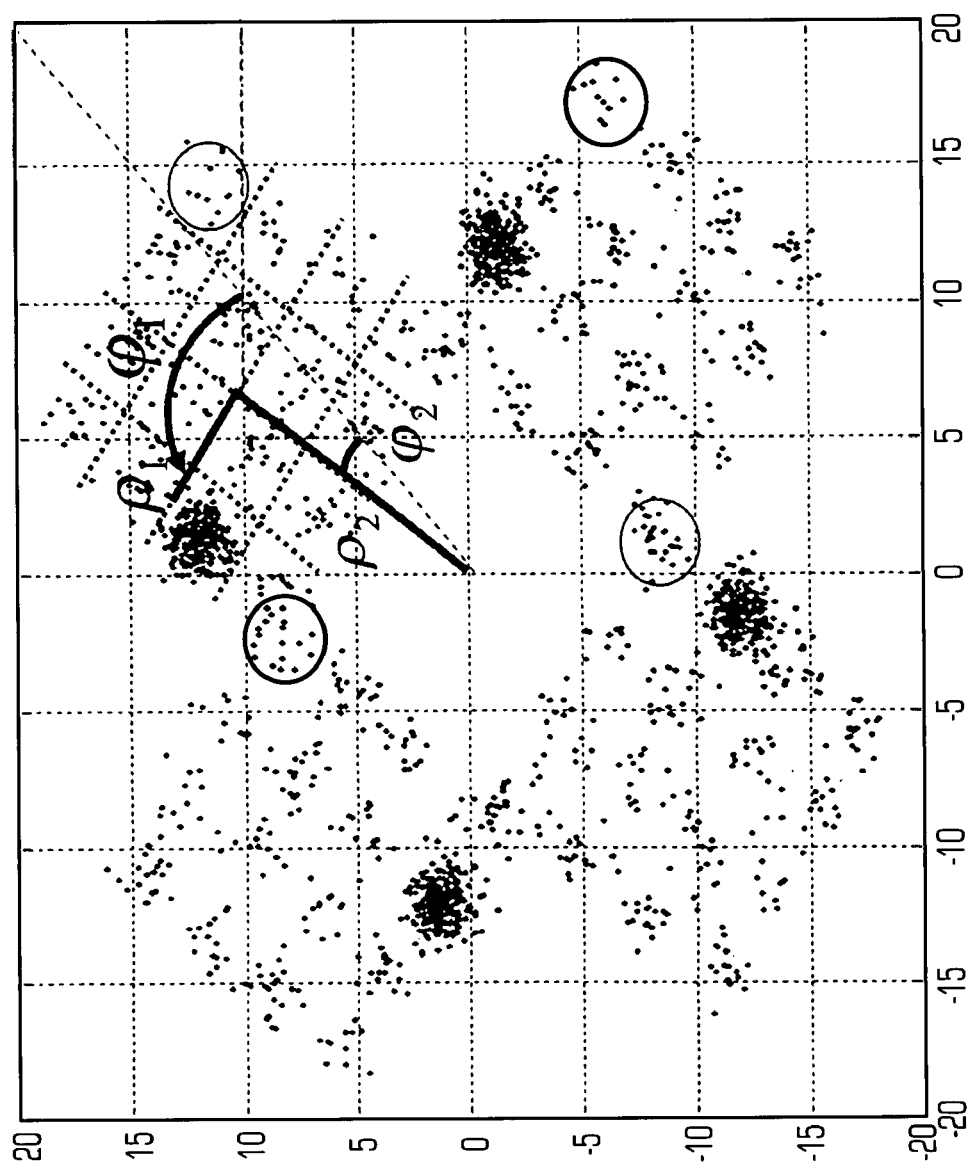
FIG. 6 illustrates an example of the results of the slicer method used by MIMO transmission apparatus.

To understand how user 1 may decode the received signal, note that equation (12) may be written as $$\tilde{y}_1 = \alpha s + s_2 + n_1 \quad (13)$$

where $\alpha \in \mathbb{C}$ and $\beta \in \mathbb{C}$. Furthermore, $\rho_\alpha=|\alpha|, \rho_\beta=|\beta|$ and $\phi_\alpha=\angle\alpha, \phi_\beta=\angle\beta$. FIG. 6 shows the slicing operation in detail. The decision regions that user 1 needs are expressed in terms of $\rho_\alpha$, $\rho_\beta$, $\phi_\alpha$ and $\phi_\beta$. The transmitter has to share knowledge of channel dependent parameters $\rho_\alpha$, $\rho_\beta$, $\phi_\alpha$ and $\phi_\beta$ with user 1. It is important to note that the detection for user 1 is only partially coupled with user 2's transmit signal and that user 1 does not require knowledge of every transmit symbol for user 2, as in successive interference cancellation. If the channel coherence time is much larger than the symbol period, it is reasonable to assume that the transmitter aids user 1 detection by coordinating knowledge of $\rho_\alpha$, $\rho_\beta$, $\phi_\alpha$ and $\phi_\beta$ with user 1. Power scaling precoding preserves the shape of the user constellations permitting a structured decoding algorithm. The non-linear precoding does not preserve the shape of the user constellations and makes decoding harder.

FIG. 6 illustrates the received signal at user 1 over many symbol periods for a fixed channel realization. In general, the received signal points for user 1 may not be easily "separable". FIG. 6 illustrates the resulting overlap of received signal points causing decoding ambiguity. In such scenarios, depending upon the transmit symbol for user 2, the constellation for user 1 is adapted or "re-labeled" such that overlapping points in the received signal at user 1 map to the same transmit symbol, thus reducing symbol error probability. Additional coordination between the central transmitter and the receiver is required which is known as adaptive constellation switching.

Figure 7:
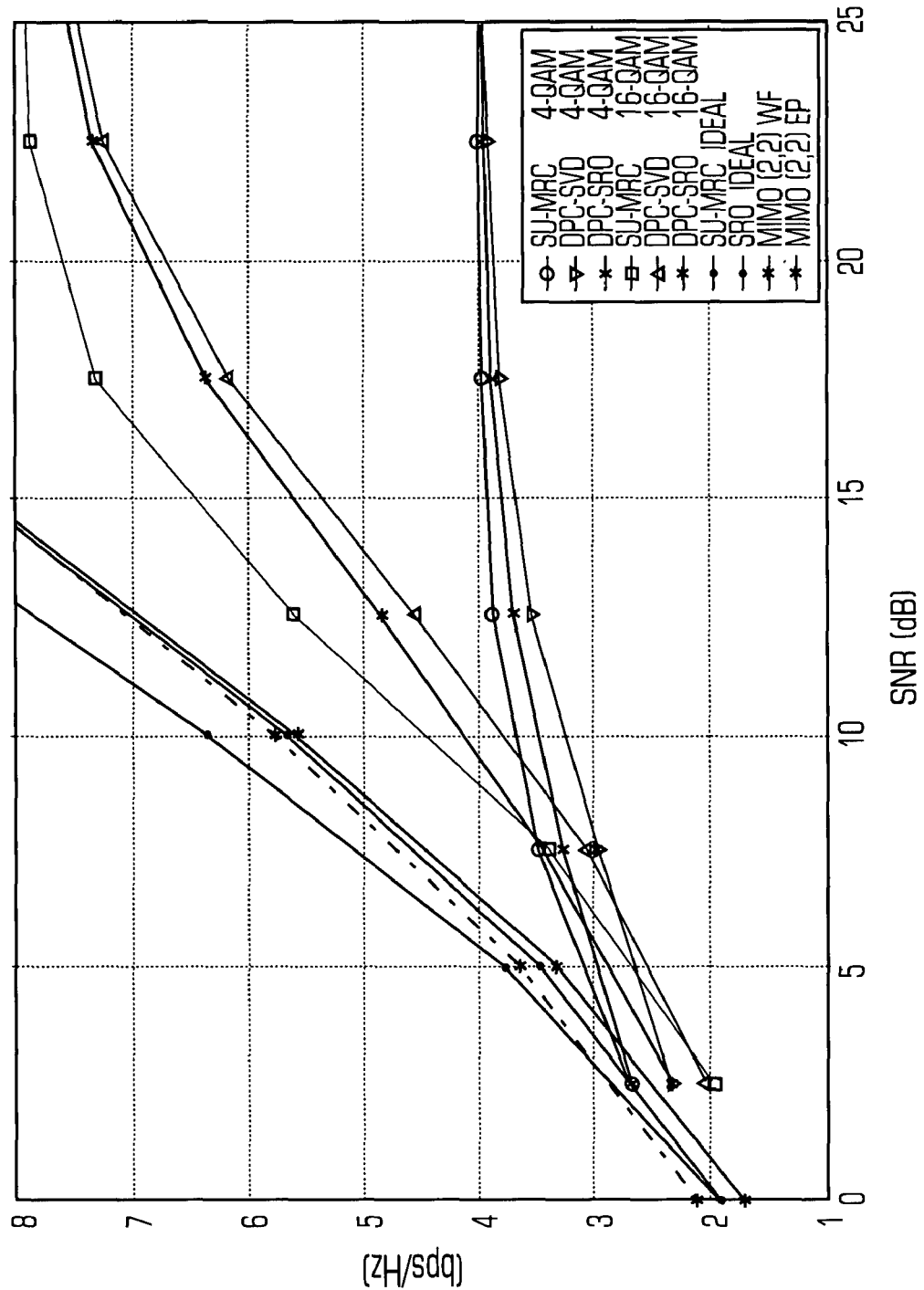
FIG. 7 illustrates the spectral efficiency of the MIMO transmission system as compared against other known systems.
Figure 8:
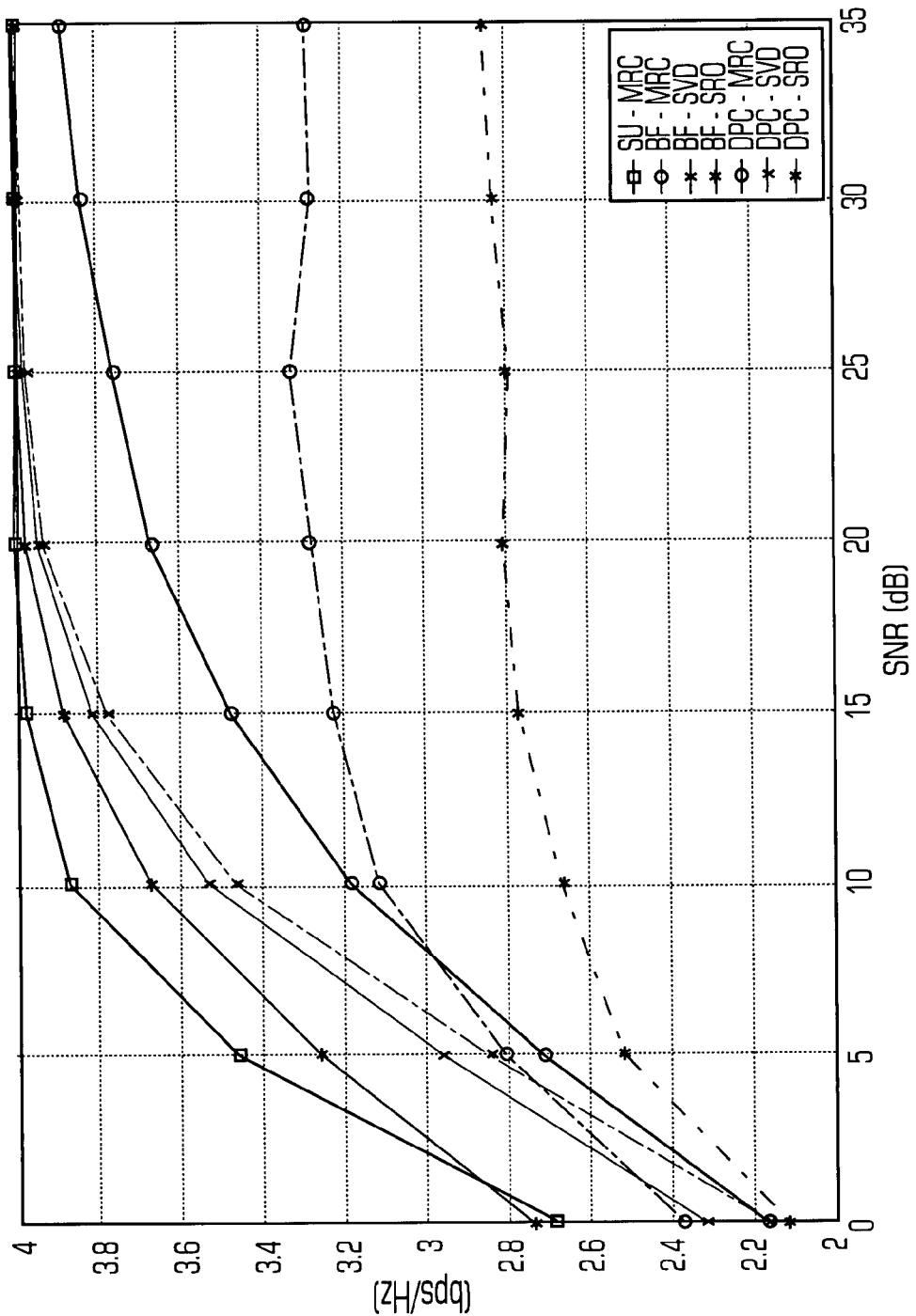
FIG. 8 illustrates the spectral efficiency of the MIMO transmission system for 4-QAM compared to other systems.
Figure 9:
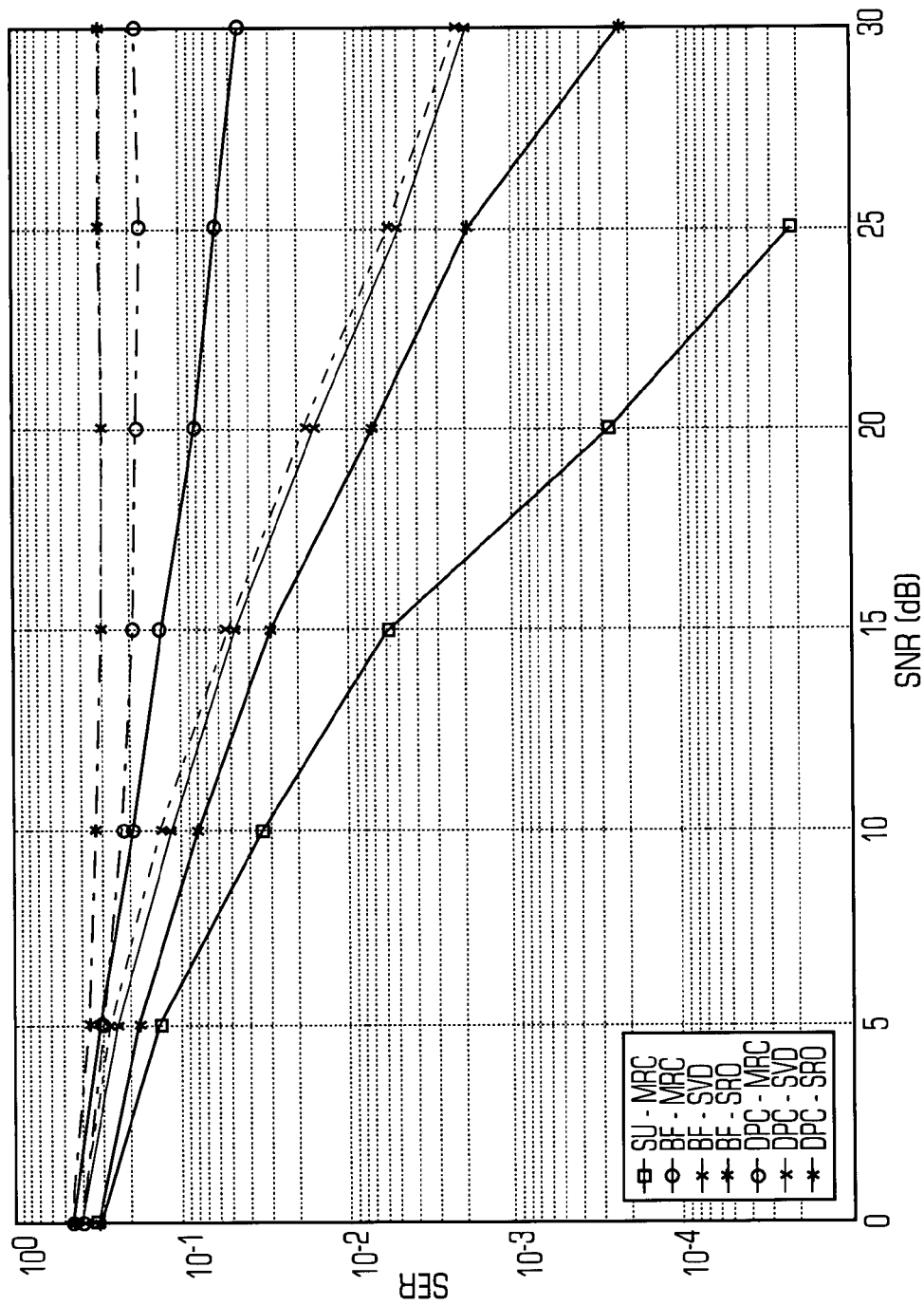
FIG. 9 illustrates the substitution error rate of the MIMO transmission system for 4-QAM compared to other systems.

FIG. 7 plots the capacity versus the signal to noise ratio (SNR). The first set of plots in the figure are the ideal bandwidth-normalized Shannon capacities for single user max ratio combining (SU-MRC) and sum rate optimization (SRO) and multiple input, multiple output (MIMO). For the SU-MRC ideal, the capacity is calculated assuming that even though there are two users in the system, individual user transmissions do not interfere with each other so that the available power $P_T$ is equally divided among the two users.

For MIMO, the capacity can be determined by known waterfilling (WF) or equal power. For the MIMO system described herein may be considered an $M_t=2$, $M_r=2$ MIMO system with cooperating receivers so that the capacity of a MIMO link is obtained by waterfilling. This case represents a strict upper bound on the sum-rate capacity for two users. Instead of waterfilling, if no channel knowledge is available at the transmitter, then the ergodic capacity maximizing strategy is equal power per eigenmode.

The SRO ideal case represents the ideal sum-rate capacity of a broadcast channel with Mt=2 and two-receivers each with $M_r=1$. Notice that SRO Ideal performs better than MIMO 2×2 EP but worse than MIMO 2×2 WF, and at low SNRs, SRO Ideal out-performs SU-MRC Ideal.

The well known Shannon capacity gives the maximum error-free capacity for a given SNR. However, Shannon capacity can only be achieved under ideal conditions with infinite data block length. Practical system designs will experience occasional channel introduced errors in the data transmission. In such cases, a measure of performance may be adopted known as "spectral efficiency" and measure in the same units as bandwidth normalized channel capacity (bps/Hz), $$C_{bps/Hz}(SNR)(1-P_{SER}(SNR))\log_2 M$$

where M is the constellation size and PSER is the symbol error probability for a given SNR.

The second set of plots in FIG. 7 plot "spectral efficiency" vs. SNR. In addition to SU-MRC, we consider ZF-BF and DTC-SRO. ZF-BF involves joint (for both users) SINR maximization wherein SINR maximization is an effective method of spatial nulling for space division multiple access, also described in FIG. 5. The DTC-SRO method uses sum-rate optimal beam-forming vectors combined with dirty tape pre-coding. As shown in FIG. 7, DTC-SRO outperforms ZF-BF for both 4-QAM and 16-QAM. Again, for comparison, we plot the SU-MRC. At low SNRs, DTC-SRO yields up to a factor of 1.5 in average "spectral efficiency" over ZF-BF. Alternately, with DTC-SRO, a given "spectral efficiency" is achieved at up to 5 dB lower transmit power than ZF-BF. It is also of some interest to compare "spectral efficiency" with the ideal Shannon capacity. However, to be able to compare the simulated "spectral efficiency" curves with the ideal Shannon capacity, we must account for i) excess bandwidth and ii) shaping loss. In typical wireless systems that do no signal shaping, we can expect a 1.53 dB shaping loss and ≈1 dB of excess bandwidth due to pulse shaping. Thus, in the figure the simulated curves with QAM constellations were penalized by 2.53 dB to allow a comparison with the ideal capacity curves. Now, an implementation of the capacity transmission system and method will be described with reference to FIGS. 3 and 4.

Figure 3:
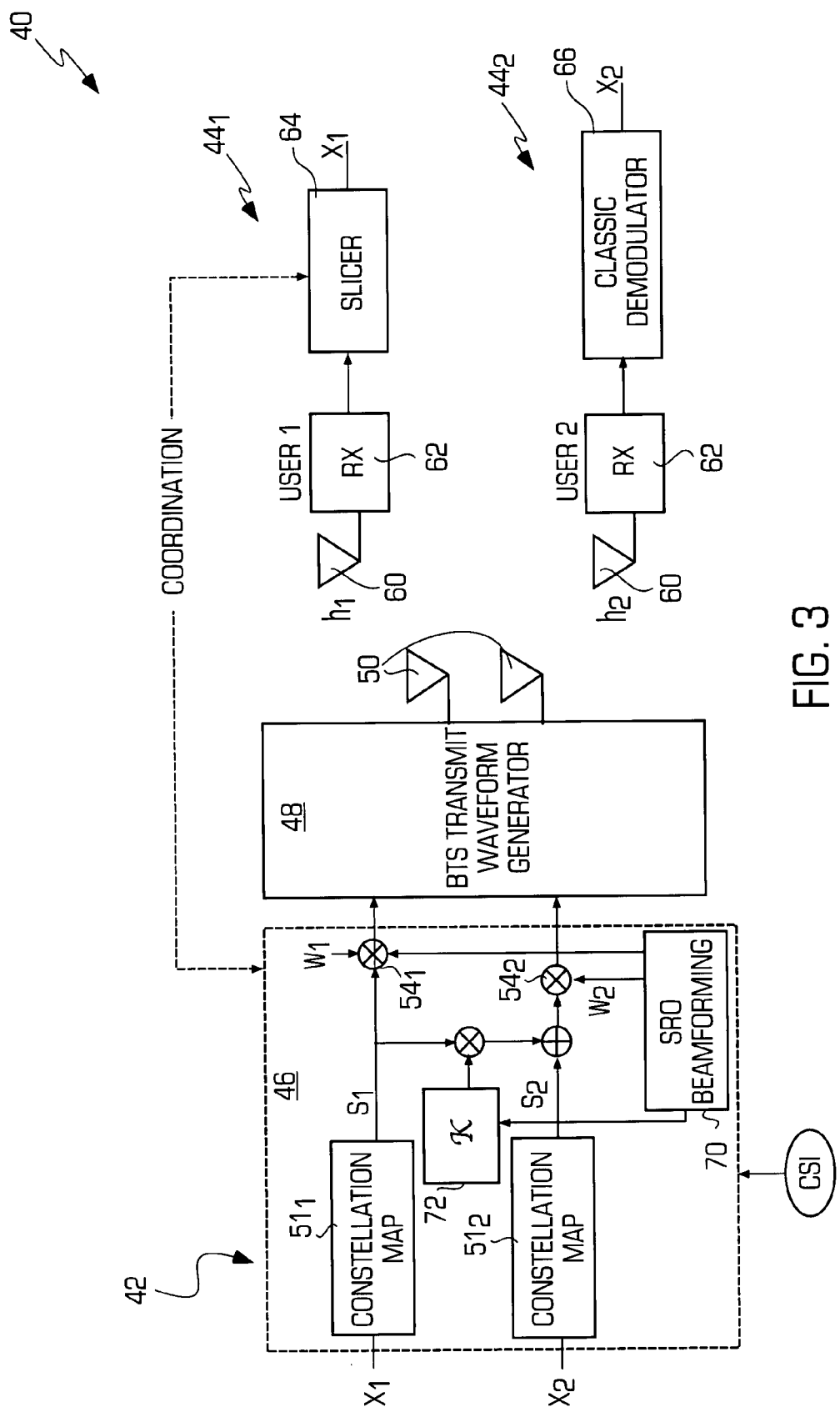
FIG. 3 illustrates an example of another embodiment of the MIMO transmission apparatus.
Figure 4:
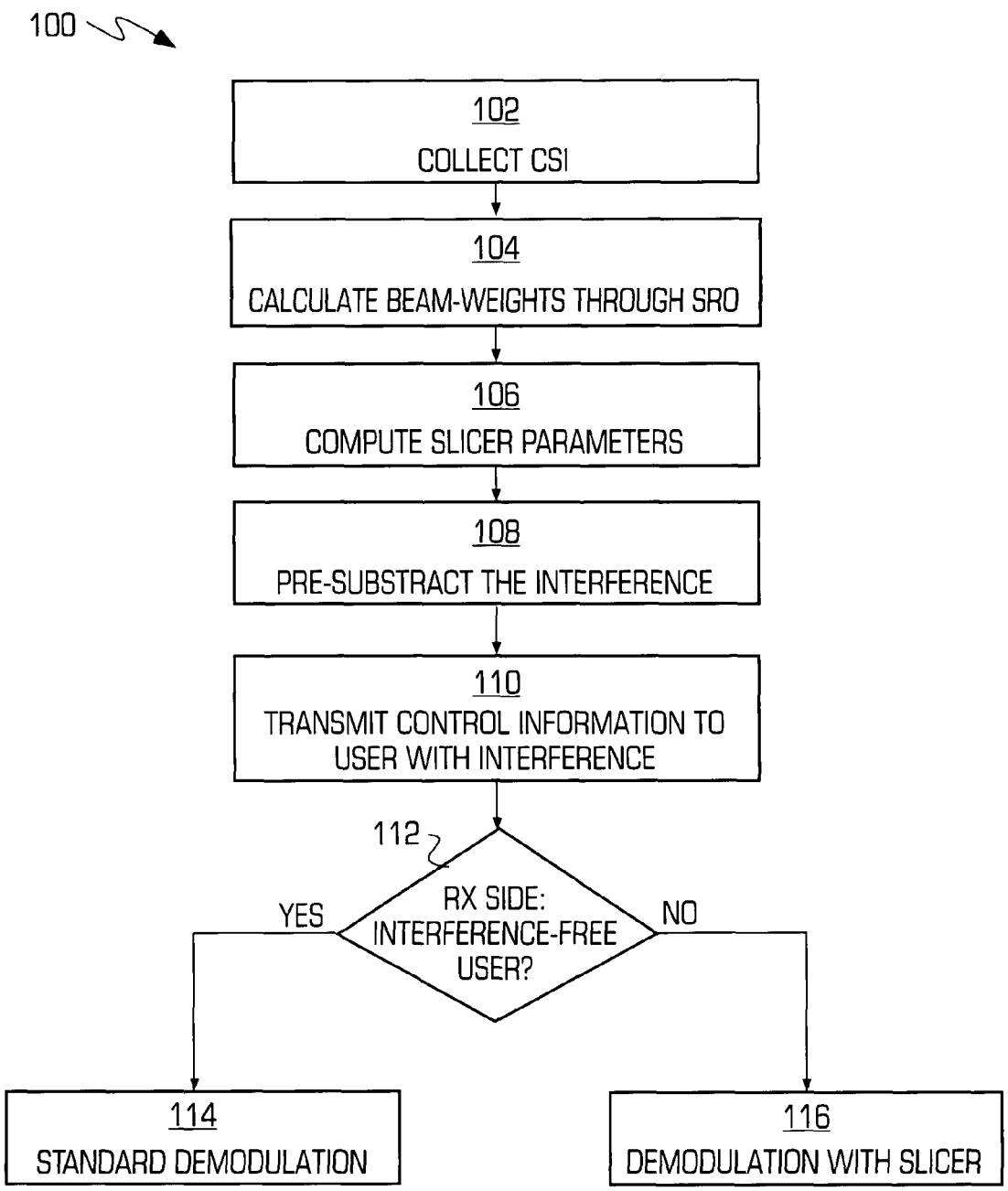
FIG. 4 is a flowchart of a MIMO transmission method in accordance with the invention.

FIG. 3 is a diagram illustrating the MIMO transmission apparatus 40 in which like components and elements to FIG. 2 have the same reference numerals and operate in the same manner. FIG. 4 is a diagram illustrating a MIMO transmission method 100 in accordance with the invention. As shown in FIG. 3, the transmitter 42 may further comprise a sum rate optimization (SRO) beamforming module 70 that is used to generate an interference value that is fed into a slicer parameter module 72 that computes the relevant slicer parameters that are communicated to the first receiver $44_1$ through the coordination described above. In a preferred embodiment of the invention, the beamforming module and slicer parameter module are implemented in a digital signal processing circuit or other processor core that executes a plurality of microcode/instructions that perform the functions of the beamforming module and slicer parameter module described below. In a preferred embodiment, the calculated slicer parameters are communicated in the signal that is transmitted to the receiver that needs to subtract out the interference. However, it is also possible to send those parameters in a different manner and those different manners are within the scope of the invention. The transmission method can be implemented for channels that have channel state information (CSI) available (such as time division duplex systems in which the CSI is available at the transmitter and receiver due to the reciprocity of the wireless channel) and can also extended and used with frequency division duplex system in which the CSI is available through feedback. Since the method assumes a flat fading channel, the method can be directly employed in orthogonal frequency division multiplexed (OFDM) systems on a tone by tone basis. The method can also be implemented in a frequency selective channel. As is apparent from FIG. 3, the transmission method in accordance with the invention requires processing both at the transmitter and receiver side wherein the transmitter 1) estimates the channel for both the users; 2) computes the pre-subtraction for one of the users; and 3) sends the information bits to both the users as well as some control information to the user who does not benefit from the pre-subtraction so that that user can configure its slicer to recover the transmitted signal. Preferably, the control information is sent on a symbol-by-symbol basis although a technique to reduce the overhead control information is to assume the control parameters to be constant over several symbols. At the receiver side, the user who benefits of the pre-subtraction simply demodulates the signal after computing the channel estimate. The other user uses the control information sent by the transmitter to construct a "slicer", and then demodulates the signal based on that slicer.

FIG. 4 illustrates the transmission method 100 in accordance with the invention which is shown as one or more steps although some steps of the method can be performed simultaneously when implemented. In addition, the steps shown in FIG. 4 are implemented at both the transmitter side and receiver side of the transmission system. Preferably, the steps associated with the transmitter are implemented by the signal processor of the transmitter (using a plurality of lines of instructions executed by the signal processor) and the steps associated with each receiver are implemented by the signal processor of the receiver (using a plurality of lines of instructions executed by the signal processor). Thus, in step 102, the transmitter collects the channel state information (CSI) in a known manner and generates channel estimations for each receiver/user ($h_1$ and $h_2$ in the example shown in FIG. 3 for user 1 and user 2, respectively). The channel estimations can be derived either directly from the uplink channels in a time division duplex system or from feedback information provided by the users/receivers in a frequency division duplex system. In step 104, the sum rate optimization (SRO) beam weights ($w_1$, $w_2$ for user 1 and user 2, respectively) for the users are calculated (noting that $w_1$, $w_2$ have norm 1 by definition) using the CSI information and the SRO process that was described above. In step 106, the transmitter computes the parameters ($\gamma$, $\Gamma_{sc}(\gamma)$, $\rho_\alpha$, $\rho_\beta$, $\phi_\alpha$ and $\phi_\beta$). In particular, the transmitter first computes the transmitter parameters ($\gamma$, $\Gamma_{sc}(\gamma)$) that are used by the transmitter to decide which user from which to pre-subtract the signal:

$$\gamma_1 = \frac{\langle h_2^*, w_1 \rangle}{\langle h_2^*, w_2 \rangle} \quad (14)$$

$$\gamma_2 = \frac{\langle h_1^*, w_2 \rangle}{\langle h_1^*, w_1 \rangle} \quad (15)$$

and the power scaling parameters:

$$\Gamma_{sc}(\gamma_1) = \|w_1 - \gamma_1 w_2\| \quad (16)$$

$$\Gamma_{sc}(\gamma_2) = \|w_2 - \gamma_2 w_1\| \quad (17)$$

The transmitter may then compute the control parameters ($\rho_\alpha$, $\rho_\beta$, $\phi_\alpha$ and $\phi_\beta$) which are then transmitted to the user/receiver to computer the slicer. Assuming the user 1 will need to computer the slicer (since user 2 already has the interference subtracted from the transmitted signal), the parameters are:

$$\alpha_1 = \frac{\sqrt{E_1}}{\Gamma_{sc}(\gamma_1)} h_1^T [w_1 - \gamma_1 w_2] \quad (18)$$

$$\rho_{\alpha 1} = |\alpha_1| \, \phi_{\alpha 1} \angle \alpha_1 \quad (19)$$

$$\beta_1 = \sqrt{E_2} h_1^T w_2 \quad (20)$$

$$\rho_{\beta 1} = |\alpha_1| \, \phi_{\beta 1} \angle \alpha_1 \quad (21)$$

The parameters for user 2 are:

$$\alpha_2 = \frac{\sqrt{E_2}}{\Gamma_{sc}(\gamma_2)} h_2^T [w_2 - \gamma_2 w_1] \quad (22)$$

$$\rho_{\alpha 2} = |\alpha_2| \quad (23)$$

$$\varphi_{\alpha 2} = \angle \alpha_2$$

$$\beta_2 = \sqrt{E_1} \, h_2^T w_1 \quad (24)$$

$$\rho_{\beta 2} = |\alpha_2| \quad (25)$$

$$\varphi_{\beta 2} = \angle \alpha_2$$

where $E_1$ and $E_2$ are the values of the transmit power allocated to user 1 and user 2, respectively.

In step 108, the transmitter (using the precoder) pre-subtracts the interference by first choosing the user to pre-subtract (based on the values of $\gamma_1$ and $\gamma_2$.) The method may select the user based on various methods including random selection or selecting the best user according to a criterion that maximizes the spectral efficiency of the method. The transmitter then uses Costa precoding to compute the pre-subtraction and then transmits the symbols using the SRO beam weights calculated above. For example, in the case when the transmitter decides to do the pre-subtraction for user 2 (and feedback $\alpha_1$ and $\beta_1$ to user 1), the transmit vector will be:

$$\tilde{x} = \frac{\sqrt{E_1}}{\Gamma_{sc}(\gamma_1)} \left[ w_1 - \frac{\langle h_2^*, w_1 \rangle}{\langle h_2^*, w_2 \rangle} w_2 \right] s_1 + \sqrt{E_2}\, w_2 s_2 \quad (26)$$

$$= \alpha_1 s_1 + \beta_1 s_2 \quad (27)$$

In the case in which the pre-subtraction is done to user 1 (and the parameters $\alpha_2$ and $\beta_2$ are feedback to user 2), the transmit vector would be of the form:

$$\tilde{x} = \alpha_2 s_2 + \beta_2 s_1 \quad (28)$$

To simplify this description, the case is used for illustration where the pre-subtraction is done over user 2, and the slicer algorithm is implemented at user 1.

In step 110, the control parameters ($\rho_\alpha$, $\rho_\beta$, $\phi_\alpha$ and $\phi_\beta$) are transmitted to the user(s) that who do not benefit from the pre-subtraction (user 1 is this example.) The control information is exploited by the user to build up his slicer to decode the transmitted signal that contains the known interference. According to the example considered before, the control information sent to user 1 will be: $\beta_{\alpha 1}$, $\rho_{\beta 1}$, $\phi_{\alpha 1}$ and $\phi_{\beta 1}$.

In step 112, the remainder of the processing occurs at each receiver wherein each receiver determines if it is the interference-free user and implements the appropriate slicer method based on that determination. In particular, consistent with the previous example, the received signal at user 1 and user 2 can be expressed as:

$$\tilde{y}_1 = h_1^T \left[ w_1 - \frac{\langle h_2^*, w_1 \rangle}{\langle h_2^*, w_2 \rangle} w_2 \right] s_1 + h_1^T w_2 s_2) + n_1 \quad (29)$$

$$\tilde{y}_2 = h_2^T w_2 s_2) + n_2 \quad (30)$$

Thus, in steps 114, 116, the procedure for user 1 and user 2 to demodulate their received symbols occurs. For purposes of illustration, user 2 benefits from the pre-subtracted and user 1 must use the control parameters to implement the slicer method although the method can be extended to the opposite case.

Demodulation of Signal without Pre-Subtraction

Thus, user 1 performs the demodulation with slicer step 116. For the sake of clarity, the subscript 1 for user 1 is omitted so that the control parameters are: $\rho_\alpha$, $\rho_\beta$, $\phi_\alpha$ and $\phi_\beta$. The process for demodulating with received signal using the control parameter may include the 1) determining the type of slicer and the implementing the chosen slicer. First, the user computes the following metric based on the information obtained by the transmitter:

$$R_\rho = \frac{\rho_\beta}{\rho_\alpha} \quad (31)$$

If $R_\rho > 1$, the HighR slicer is constructed. Otherwise, a LowR slicer is constructed. In the below discussion, the key parameters to construct both the types of slicers are described. More details of how to draw the slicers based on these parameters is provided in the graphical representations shown in FIG. 6. The slicer is implemented in software/microcode resident in each receiver that is executed by the signal processor of each receiver wherein the slicer is implemented based on the control parameters provided to the receiver.

HighR Slicer

First, the phase adjustment to the received signal is calculated as:

$$\tilde{y}_{p1} \tilde{y}_1 e^{-j\phi_\alpha} \quad (32)$$

Then, the slicer parameters are computed with:

$$\varphi_{CG} = \text{mod}\left[(\varphi_\beta - \varphi_\alpha + \frac{\pi}{4}), \frac{\pi}{2}\right] \quad (33)$$

being the phase of the "Constellation Group" of reference (in the first quadrant:

$$a = |\rho_\beta \cos\varphi_{CG}| \quad (34)$$

$$b = |\rho_\beta \sin\varphi_{CG}| \quad (35)$$

$$D = \frac{a-b}{2} \text{ and } \tilde{D} = a+b \quad (36)$$

$$Dx1=D, Dx2=-D, Dy1=D \text{ and } Dy2=-D \quad (37)$$

and specifically for the 16-QAM slicer, $$Dxx1=3Dx1, Dxx2=3Dx2, Dyy1=3Dy1 \text{ and } Dyy2=3Dy2 \quad (38)$$

The "Constellation Group" is decided based on the parameters set forth above. Then, the standard slicer is used for the chosen constellation group depending on the modulation user by user 1 and get the symbol estimate ŝ.

LowR Slicer

First, the phase adjustment to the received signal is calculated as:

$$\tilde{y}_{p1} = \tilde{y}_1 e^{-j\phi\beta} \quad (39)$$

Note that the phase used here is different from the phase adjustment employed by the HighR slicer. Then, the slicer parameters are computed with:

$$\varphi_{SG} = \text{mod}\left[(\varphi_\alpha - \varphi_\beta + \frac{\pi}{4}), \frac{\pi}{2}\right] - \frac{\pi}{4} \quad (40)$$

being the phase of the "symbol group" of reference (in the first quadrant) where:

$$\tilde{D} = |\sqrt{2}\rho_\alpha \cos\varphi_{SG}| \quad (41)$$

$$D = \tilde{D} - \sqrt{2}\rho_\beta \quad (42)$$

$$D_S = \rho_\alpha \cos(\cos\varphi_{SG} + \frac{\pi}{4}) - \frac{\rho_\beta}{\sqrt{2}} \quad (43)$$

$$D_{Bound} = \begin{cases} D_s - \frac{D}{2} & \text{if } D > 0 \\ 0 & \text{otherwise} \end{cases}$$

$$Dx1=D_{Bound}, Dx2=-D_{Bound}, Dy1=D_{Bound} \text{ and } Dy2=-D_{Bound} \quad (44)$$

and specifically for the 16-QAM slicer:

$$Dxx1=3Dx1, Dxx2=3Dx2, Dyy1=3Dy1 \text{ and } Dyy2=3Dy2 \quad (45)$$

Then, the symbol group is determined based on the parameters set forth above. Then, the phase shift of the estimated symbol GO as $$\hat{s}_{shif} = \hat{s} e^{-j\varphi_{shift}} \quad (46)$$

where $$\varphi_{shift} = \text{mod}\left[(\varphi_{SG} + \frac{\Pi}{4}), 2\pi\right] \quad (47)$$

For user 2 (the user that has the benefit of the pre-subtraction, the receiver uses a standard demodulator and relies of the CSI estimated at the receiver.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A method, comprising:
    calculating a beam weight using sum rate optimization and channel state information of a broadcast channel to generate at least two receiver beam weights;
    determining a set of parameters including control parameters, a transmitter parameter, and a power scaling parameter;
        wherein the transmitter parameter is determined based on the at least two receiver beam weights and a channel estimate;
        wherein the power scaling parameter is determined based on the at least two receiver beam weights and the transmitter parameter;
        wherein the control parameters are determined based on the at least two receiver beam weights, the transmitter parameter, and the power scaling parameter;
    generating, based on the set of parameters, a first transmit signal for a first receiver;
    precoding the first transmit signal by subtracting interference associated with a second transmit signal for a second receiver, from the first transmit signal to cause the first transmit signal to be substantially interference-free; and
    transmitting the control parameters to the second receiver, wherein said transmitting the control parameters to the second receiver includes transmitting the control parameters to the second receiver to cause the second receiver to demodulate the second transmit signal using a slicer with parameters based on the control parameters to remove interference from the second transmit signal.

2. The method of claim 1, wherein said generating includes using Costa precoding to generate, prior to said subtracting, the first transmit signal.

3. The method of claim 1, wherein the control parameters are transmitted to the second receiver to cause the second receiver to demodulate the second transmit signal using the control parameters to remove interference from the second transmit signal.

4. The method of claim 3, wherein said demodulation by the second receiver includes construction of a slicer using the transmitted control parameters.

5. The method of claim 4, wherein said slicer includes a HighR slicer or a LowR slicer.

6. The method of claim 1, further comprising collecting the channel state information using known channel state information.

7. The method of claim 1, further comprising collecting the channel state information using feedback from the first receiver and the second receiver.

8. The method of claim 1, wherein said generating includes generating a linear modulated transmit signal.

9. The method of claim 8, wherein said generating the linear modulated transmit signal includes employing one of quadrature amplitude modulation, phase shift key modulation, or pulse amplitude modulation.

10. The method of claim 9, wherein said quadrature amplitude modulation includes 4-QAM modulation.

11. The method of claim 9, wherein said quadrature amplitude modulation includes 16-QAM modulation.

12. The method of claim 1, wherein said calculating to generate the at least two receiver beam weights includes:
    determining covariance matrices for the first receiver and the second receiver, wherein the covariance matrices increase or maximize a sum rate capacity for the broadcast channel; and
    calculating one of the at least two receiver beam weights based on one of the determined covariance matrices.

13. The method of claim 12, wherein said generating the first transmit signal includes using a modulo operation to reduce a power change caused by said subtracting.

14. The method of claim 12, wherein said power scaling parameter is used at least in part to reduce a power change caused by said subtracting.

15. The method of claim 1, wherein the substantially interference-free first transmit signal is interference-free.

16. The method of claim 1, further comprising transmitting other control parameters to the first receiver.

17. A transmission apparatus, comprising:
    a signal processor configured to determine a set of characteristics of a first transmit signal and of a second transmit signal; and
    a waveform generator coupled to the signal processor and configured to generate the first transmit signal and the second transmit signal based on the set of characteristics; and
    wherein the signal processor is further configured to:
        collect channel state information about a broadcast channel;
        calculate a first receiver beam weight and a second receiver beam weight based on sum rate optimization and the channel state information;
        determine a set of parameters including control parameters, a transmitter parameter, and a power scaling parameter;
            wherein the transmitter parameter is determined based on the first and second receiver beam weights and a channel estimate;
            wherein the power scaling parameter is determined based on the first and second receiver beam weights and the transmitter parameter;
            wherein the control parameters are determined based on the first and second receiver beam weights, the transmitter parameter, and the power scaling parameter;
        precode the first transmit signal by subtraction from the first transmit signal, interference associated with the second transmit signal, to make the first signal substantially interference-free; and
        cause a transmission of the control parameters to the second receiver,
            wherein said transmission of the control parameters to the second receiver includes transmission of the control parameters to the second receiver to cause the second receiver to demodulate the second transmit signal using a slicer with parameters based on the control parameters to remove interference from the second transmit signal.

18. The apparatus of claim 17, wherein the signal processor is further configured to generate, prior to said subtraction, the first transmit signal using Costa precoding.

19. The apparatus of claim 17, wherein the waveform generator is further configured to generate a linear modulated transmit signal.

20. The apparatus of claim 19, wherein the waveform generator is configured to generate the linear modulated transmit signal using linear modulation, wherein the linear modulation includes quadrature amplitude modulation, phase shift key modulation, or pulse amplitude modulation.

21. The apparatus of claim 20, wherein the quadrature amplitude modulation includes 4-QAM modulation or 16-QAM modulation.

22. The apparatus of claim 20, wherein the signal processor is further configured to:
    determine covariance matrices for the first transmit signal and for the second transmit signal, wherein the covariance matrices maximize or increase a sum rate capacity for the broadcast channel; and
    calculate the first receiver beam weight and the second receiver beam weight based on the determined covariance matrices.

23. The apparatus of claim 22, wherein the signal processor is further configured to reduce a power change caused by said subtraction of the interference based on a modulo operation.

24. The apparatus of claim 17, wherein the substantially interference-free first transmit signal is interference-free.

25. The apparatus of claim 17, wherein the signal processor is further configured to transmit other control parameters to the first receiver.

26. A method, comprising:
    calculating, by a transmitter, a plurality of beam weights respectively for a plurality of transmit signals using sum rate optimization and a set of channel state information for a broadcast channel;
    determining, by the transmitter, a set of parameters including control parameters, a transmitter parameter, and a power scaling parameter;
        wherein the transmitter parameter is determined based on the plurality of beam weights and a channel estimate;
        wherein the power scaling parameter is determined based on the plurality of beam weights and the transmitter parameter;
        wherein the control parameters are determined based on the plurality of beam weights, the transmitter parameter, and the power scaling parameter;
    precoding, by the transmitter, a first transmit signal of the plurality of transmit signals, based on the set of parameters, wherein said precoding includes subtracting, from the first transmit signal, interference associated with a second transmit signal to cause the first transmit signal to be substantially interference-free; and
    transmitting, by the transmitter, the control parameters to the second receiver to cause the second receiver to demodulate the second transmit signal using a slicer with parameters based on the control parameters to remove interference from the second transmit signal.

27. The method of claim 26, wherein said precoding further includes Costa precoding.

28. The method of claim 26, wherein the substantially interference-free first transmit signal is interference-free.

29. A method for demodulating a signal in a multiple input, multiple output system, the method comprising:
    receiving, from a transmitter, a transmit signal having interference;

receiving control parameters from the transmitter,
- wherein the control parameters are based on a plurality of beam weights, a transmitter parameter, and a power scaling parameter;
- wherein the plurality of beam weights are based on sum rate optimization and channel state information;
- wherein the transmitter parameter is based on the plurality of beam weights and a channel estimate;
- wherein the power scaling parameter is based on the plurality of beam weights and the transmitter parameter;

constructing a slicer based on the set of control parameters, wherein the slicer identifies a symbol group; and demodulating the received transmit signal based on the identified symbol group,
- wherein said demodulating the received transmit signal includes demodulating the received transmit signal using the slicer, which has parameters based on the received control parameters, to remove interference from the received transmit signal.

30. The method of claim 29, wherein the slicer includes a LowR slicer or a HighR slicer.

31. The method of claim 29, wherein another transmit signal has been precoded by subtraction, from the another transmit signal, interference associated with the received transmit signal to cause the another transmit signal to be substantially interference free.

32. A receiver apparatus to demodulate a received transmit signal in a multiple input, multiple output system, the receiver apparatus comprising:
- a receiver circuit configured to receive, from a transmitter, the transmit signal having interference; and
- a demodulation circuit coupled to the receiver circuit and configured to construct a slicer that identifies a symbol group based on control parameters received from the transmitter, and wherein the demodulation circuit is further configured to demodulate the received transmit signal based on the identified symbol group,
- wherein the control parameters are based on a plurality of beam weights, a transmitter parameter, and a power scaling parameter;
- wherein the plurality of beam weights is based on sum rate optimization and channel state information;
- wherein the transmitter parameter is based on the plurality of beam weights and a channel estimate;
- wherein the power scaling parameter is based on the plurality of beam weights and the transmitter parameter; and
- wherein the demodulation of the received transmit signal includes demodulation of the received transmit signal using the slicer, which has parameters based on the received control parameters, to remove interference from the received transmit signal.

33. The receiver apparatus of claim 32, wherein the demodulation circuit is further configured to construct the slicer, wherein the slicer includes a LowR slicer or a HighR slicer.

34. The receiver apparatus of claim 32 wherein another transmit signal has been precoded by subtraction, from the another transmit signal, interference associated with the received transmit signal to cause the another transmit signal to be substantially interference free.

* * * * *

UNITED STATES PATENT AND TRADEMARK OFFICE
CERTIFICATE OF CORRECTION

PATENT NO.         : 8,130,862 B2
APPLICATION NO.    : 11/791090
DATED              : March 6, 2012
INVENTOR(S)        : Forenza et al.

It is certified that error appears in the above-identified patent and that said Letters Patent is hereby corrected as shown below:

Title Page 2, item (56), under "Other Publications", in Column 2, Line 19, delete "Achivable" and insert -- Achievable --.

Column 17, line 27, in Claim 31, delete "interference free." and insert -- interference-free. --.

Column 18, line 30, in Claim 34, delete "interference free." and insert -- interference-free. --.

Signed and Sealed this
Fourth Day of September, 2012

David J. Kappos
*Director of the United States Patent and Trademark Office*